United States Patent [19]
McGuire et al.

[11] 3,815,680
[45] June 11, 1974

[54] METHOD FOR FRACTURING AND PROPPING UNCONSOLIDATED AND DILATANT SUBTERRANEAN FORMATIONS

[75] Inventors: Lindell V. McGuire; Derry D. Sparlin, both of Ponca City, Okla.

[73] Assignee: Continental Oil Company, Ponca City, Okla.

[22] Filed: Mar. 8, 1973

[21] Appl. No.: 339,480

Related U.S. Application Data

[63] Continuation of Ser. No. 135,438, April 19, 1971, abandoned.

[52] U.S. Cl.................. 166/281, 166/295, 166/308
[51] Int. Cl..................... E21b 33/138, E21b 43/26
[58] Field of Search .......... 166/280, 281, 295, 308; 252/8.55

[56] References Cited
UNITED STATES PATENTS

| | | | |
|---|---|---|---|
| 2,805,721 | 9/1957 | Maly | 166/281 |
| 3,070,160 | 12/1962 | Reistle | 166/281 |
| 3,370,650 | 2/1968 | Watanabe | 166/280 |
| 3,417,819 | 12/1968 | Wyllie | 166/280 |
| 3,443,637 | 5/1969 | Sparlin | 166/295 |
| 3,531,409 | 9/1970 | Seffens | 252/8.55 |

*Primary Examiner*—David H. Brown
*Attorney, Agent, or Firm*—F. Lindsey Scott

[57] ABSTRACT

An improved method for fracturing and propping unconsolidated and dilatant subterranean formations, the improvement comprising the addition of a tackifying agent to the fracturing fluid.

10 Claims, No Drawings

METHOD FOR FRACTURING AND PROPPING UNCONSOLIDATED AND DILATANT SUBTERRANEAN FORMATIONS

This is a continuation, of application Ser. No. 135,438, filed Apr. 19, 1971, now abandoned.

FIELD OF THE INVENTION

This invention relates to a method for stimulating the production of a fluid containing subterranean formation. It is also concerned with fracturing and propping geological formations surrounding a wellbore. More particularly, it is concerned with fracturing and propping geological formations which are unconsolidated or dilatant in nature.

DESCRIPTION OF THE PRIOR ART

In the development of fluid producing geological formations, strata are often discovered which although they are known to contain large quantities of a desired fluid will not produce at a satisfactory rate because of the internal resistance of the formation to fluid flow. This resistance is due to a number of factors such as poor permeability, discontinuous porosity, drilling mud coatings formed on the walls or introduced into the interstices of the producing formations, etc. It is desirable that when possible, the production capabilities of such wells be stimulated by artificial means. Accordingly, there has been considerable development of techniques such as undermining, shooting and acidizing which are employed when it is necessary to effect stimulation.

A more recent expedient for use in completion or stimulation work is the hydraulic fracturing procedure which consists of: (1) introducing into the formation a liquid, hydraulic medium at a sufficient pressure to overcome the natural formation pressure and native rock stresses and fracture the formation, and (2) injecting a fluid containing particulate matter which maintains the fracture opening. This technique is most effective when consolidated formations are fractured. Its effectiveness is considerably less when unconsolidated or dilatant formations are to be fractured, because (1) such formations tend to deform rather than fracture, (2) the greater permeability generally associated with these formations can cause excessive fluid dissipation into the formation reducing the hydraulic pressure effects available for overcoming native rock stresses and (3) the propping agent (particulate matter) is mixed with the formations and cannot function effectively as a proppant.

One method for controlling sands in unconsolidated formations is described in U.S. Pat. No. 3,070,160, issued Oct. 1, 1958 to Reistle, which describes a method for using a hardening material to consolidate the formation radially from the wellbore followed by fracturing by conventional fluid fracturing methods. This particular approach, while an improvement over ordinary fracturing methods for this type formation, leaves something to be desired in that while fracturing is achieved in the consolidated sheath surrounding the wellbore little is done to improve the fracturing achieved in the sands immediately outside the sheath. It is difficult to propagate or achieve fractures in such unconsolidated formations due to the fact that pressures are dissipated readily by the porous nature of the formation. Once such fractures are initiated and propagated, then propping the fracture open and maintaining it is very difficult because the formation sand particles mix with and are embedded with the propping particles to the extent that conductivity through the fracture is no better than through the formation sand itself. Furthermore, it can be shown that a fracturing sand mixed with formation sand may have even less permeability than the formation sand alone.

Other attempts to solve this problem previously include approaches involving fluid loss additives, viscous fluids, gel fluids and freezing ice in the formation interstices (U.S. Pat. No. 2,801,698, issued Aug. 6, 1957 to Bond). All allow propagation of a fracture in unconsolidated sand to some degree, but do nothing to solve the problem of fracture initiation or propping.

U.S. Pat. No. 3,443,637 issued May 13, 1969 to Sparlin shows the use of a tackifying agent to aid in placement and control in gravel packing, but does not show any improvement in propping fractures.

OBJECTS OF THE INVENTION

It is an object of this invention to achieve fracturing and propping of unconsolidated formations to stimulate production from such formations and concurrently control the unconsolidated formation sand.

SUMMARY OF THE INVENTION

It has now been found that, in the method for fracturing and propping unconsolidated and dilatant subterranean formations penetrated by a borehole, comprising pumping a consolidating material into said borehole, allowing time for the consolidating material to set and bind together the formation particles, placing a fracturing fluid, containing a propping agent in said borehole and applying sufficient pressure to said fracturing fluid to fracture the consolidated portion of the formations, an improvement is achieved by addition of a tackifying agent to the fracturing fluid.

DESCRIPTION OF THE PREFERRED EMBODIMENTS

Initiation of fractures is unconsolidated formations can be obtained by first consolidating the formation for several feet radially around the wellbore with an artificial or natural cementing material, then pumping hydraulic fluids into the formation at pressures great enough to crack the matrix. The consolidation can be made in such a manner as to leave little or no permeability in the sand. This can be accomplished by injection of one or more of a number of different materials into the formation such as salts, clays, cements, silicates, plastics and the like. Control over the residual permeability can be obtained by diluting these materials with inert solvents in such proportions that when the consolidating materials harden the solvent remains mobile and can be readily removed. Other techniques such as precooling the formation or over flushing the consolidating materials or using shrinkable materials can also be used.

One advantage of this technique for initiating the fracture is that little or no leak off occurs until a large pressure differential is established. At the instant that the consolidating matrix breaks the sudden surge of fluids into the formation creates a jetting inertia in a localized region which penetrates into the formation. A further advantage is that a fracture so initiated will have a better chance of being extended in a confined direction or plane within the formation or in the desired location away from the wellbore in contrast to the random pattern expected with more conventional techniques. Another advantage is that after the formation has been consolidated it can be notched in such a way that some control of the fracture orientation is achieved (e.g., a vertical notch will initiate a vertical fracture).

Extension of the fracture is subsequently achieved by continuing to pump at sufficiently high rates and pressures with a fluid having low fluid loss properties. This low fluid loss can be achieved by methods well-known in the art (i.e., high viscosities and additives).

The improvement of the present invention is the addition of tackifying agent to the fracturing fluid which will help stabilize the formation sands and prevent them from easily rolling over each other or otherwise being displaced from their original orientation except as they are being forced to part in the fracture. This tackifying agent also serves to reduce the fluid loss into the formation.

Materials which are useful as tackifying agents include thermosetting resins, thermoplastic polymers, rubbers, gums, natural resins, waxes, greases, heavy oils, and simple syrups (a viscous solution of sugar in water).

Specific examples of thermosetting resins which are used in the present invention are phenolic resins (hydroxy arylaldehyde condensation products, hydroxy alkylaryladehyde condensation products) amine aldehydes, furan resins, epoxy resins, polyisocyanate resins, and polyester resins. Of these, phenol formaldehyde and furan resins are preferred.

Specific examples of thermoplastic polymers which are used in the present invention are cellulose resins, polyethylene, silicone and polyvinyl polymers. Of these, cellulose resins are preferred.

Specific examples of rubbers which are used in the present invention are styrene-butadiene, neoprene, poly 2-chloro-butadiene, acrylonitrile butadiene, nitrile, ethylene-propylene, natural and reclaimed rubbers. Of these styrene-butadiene and reclaimed rubber are preferred.

Specific examples of gums which are used in the present invention are copals, rosins, and modified rosins. Of these, modified rosins are preferred.

Specific examples of natural resins which are used in the present invention are crude oils, heavy refined oils, tars, asphalts and residual oils. Of these, residual hydrocarbon oils and heavy hydrocarbon refined oils are preferred.

The type of tackifier selected for a particular use will depend upon the carrier liquid used for the gravel. The tackifier should not be soluble in the carrier liquid but should have sufficient affinity for the gravel material that it will readily coat the particulate surfaces. Thus, if water, brine, or water base muds are used as the carrier fluid, greases, waxes and water-insoluble thermosetting resins, thermoplastic polymers, rubbers, gums and natural resins should be used. Similarly if the carrier fluid is a hydrocarbon oil or oil base mud, the tackifier should be an oil insoluble thermosetting resin, thermoplastic polymer, rubber, gum, natural resin, or simple syrup.

Propping the fracture will be achieved by using a graded gravel or a narrow range of gravel sizes so that the formation sand cannot penetrate into a pack of the gravel more than three grain diameters, and preferably one grain diameter. Such packed gravel will at the same time have at least 10 fold more permeability than the formation sand, and preferably more than 100 fold more permeability. The gravel size will be determined by techniques well-known in the art of sand control and filtering technology and by measurements of the permeability of the gravel.

The required fracture width packed with enough gravel to form layers of unmixed gravel is achieved by pumping extremely high concentrations of gravel in a viscous fluid. Concentrations off from 5 pounds per gallon to 25 pounds per gallon will be required with fluid viscosities of 57 cs. to 10,000 cs. at formation temperature. Included in the gravel will be a tackifying agent, as previously described, which will help maintain flow en masse of the gravel through the fracture and reduce mixing between the gravel and formation sand. A particularly desirable tackifying agent is a hardenable resin which will upon completion of the fracturing treatment consolidate the gravel and the formation sand in the vicinity of the fracture. An alternate method for preventing movement of the gravel is the use of a screen in the wellbore the screen being left to prevent movement of the gravel mixture out of the formation back into the wellbore. This allows the use of a non-setting resin as a tackifying agent, which results in a slightly higher fracture conductivity and less expense.

A second method for preventing removal of the gravel after the treatment is the use of an increased concentration of partially polymerized or polymerizable resin tackifying agent in the last of the treatment. An overflush of catalyst solution is subsequently injected which hardens the resin and consolidates the gravel in the vicinity of the wellbore, thus eliminating the need for a screen. By either method penetration of sand into the gravel is eliminated and the maximum permeability contrast is maintained. The loss of gravel from the fracture after the well is placed in production is also eliminated. The end result is that the zone treated by this process has been fracture stimulated and control of the unconsolidated sand and the fracture propping has been achieved.

EXAMPLE

A well in the Gulf Coast area of Texas was completed in an unconsolidated section of Frio sand with perforations at 9420 feet to 9468 feet. The average permeability of the sand was measured at 19 md and its porosity averaged 23 percent. The well had a potential production test of 2.4 BPD of 41° API gravity crude but continuously produced sand. It was desirable to increase the production capacity of the well by fracturing. Due to the dilatant and unconsolidated nature of the formation sand conventional fracture would be unsuccessful. The gravel which would normally be used to prop a conventional fracture would mix with and embed into the natural formation sand resulting in a fracture conductivity no greater than the formation conductivity.

A fracture treatment per this invention would comprise of the following steps:

1. Inject 100 bbl of diesel fuel followed by 50 bbl of 50 percent by volume of Resin A and 50 percent by volume of Resin B containing 2 percent by volume of a 25 percent solution of NaOH and 0.1 percent by volume of α-amino propyltriethoxysilane.

2. Displace this mixture into the formation with diesel fuel using 50 bbl of diesel fuel in excess of the tubing capacity.

3. Shut down the well for 24 hours until the resin has cured.

4. Inject 50 bbl of viscous carbon black oil (SpCr1.05, viscosity 100 cps at 122°F.) at a rate and pressure sufficient to break down the consolidated formation.

5. Inject 400 bbl of a slurry of 15 lb of 20–40 U.S. mesh gravel per gallon of oil at 10 bpm slowly decreasing the rate to 2 bpm. The slurry contains 0.1 gallons of tackifying agent (33 percent Resin C in furfuryl alcohol) per 100 lbs. of gravel.

6. Inject an additional 100 bbls of said slurry increasing the concentration of tackifying agent to 1.25 gallons per 100 lb. of gravel at continually slower rates until a sand-out occurs.

7. Wash out excess gravel from the wellbore with carbon black oil.

8. Inject 100 bbl of 2 percent trichloroacetic acid dissolved in diesel fuel into the formation and overflush with 100 bbl of diesel fuel.

9. Shut in the well for 6 hours for the resin to cure.

10 Put well on production.

Resins used are more fully described below:

Resin A — In a suitable container were mixed together 195 pounds of phenol, 205 pounds resorcinol, 253 pounds of a 37 percent by weight aqueous formaldehyde solution and 25 pounds of a 50-percent aqueous solution of sodium hydroxide. The mixture was held at about 175°F. for about 2.5 hours, allowing the phenol, resorcinol and formaldehyde to partially react together. The so-obtained reaction mass was then mixed with about 3.2 gallons of 32-percent aqueous hydrochloric acid solution to lower the pH to between 4 and 6. As the acid was added, the mixture stratified. The upper layer, which constituted about 38 percent of the total volume was largely salt water and was discarded after allowing the reaction mass to cool to room temperature. The lower layer comprised a slightly acid, partially condensed aqueous phenol formaldehyde polyhydroxy benzene liquid resin. It had a viscosity of about 150 cps. and a density of about 10.2 pounds per gallon.

Resin B — The other of the two liquid plastics was made by mixing together 558 pounds of cryslic acid, 534 pounds of a 37-percent aqueous formaldehyde solution, 267 pounds of paraformaldehyde and 33.5 pounds of a 50-percent aqueous sodium hydroxide solution. The mixture was heated to a temperature of 125°F. and maintained at this temperature until the mixture became clear. This clarification took place usually in about 30 minutes. To the product thus obtained was added 15 gallons of a 15-percent hydrochloric acid solution. The addition of the acid brought about the formation of two liquid phases which stratified into two layers. The upper layer, consisting largely of water, was discarded. The remaining lower layer was heated to 175°F. for from 1 to 1.5 hours so as to bring the viscosity as measured at 80°F. to about 200 cps. The resulting liquid plastic had a pH between 3.7 and 4.3 and a density of 9.5 pounds per gallon. The amount obtained was about 102 gallons.

Resin C — This is a single component hydroxy arylaldehyde resin prepared by reacting together at 60° to 70° C. 500 grams phenol, 40 grams 37-percent aqueous solution of formaldehyde and 25 grams sodium hydroxide dissolved in 25 grams water until the formaldehyde was fully combined. To this mixture was added 50 grams resorcinol and 50 grams 37-percent aqueous solution of formaldehyde. The resulting mixture was refluxed and dehydrated under vacuum to a viscosity of 3200 cps. The resin was then mixed with furfuryl alcohol in a ratio of 1 to 2 parts by volume to form Resin D.

Having thus described the invention we claim:

1. In the method for fracturing and propping unconsolidated and dilatant subterranean formations penetrated by a borehole comprising:
   a. pumping into said formations a consolidating material to set and bind together the particles of said formation,
   b. allowing time for said consolidating material to set and bind together the particles of said formation surrounding said borehole,
   c. placing a fracturing fluid in said borehole adjacent the consolidated portion of said formation and applying sufficient pressure to said fracturing fluid to produce fractures extending through said consolidated portion of said formation to thereby fluidly communicate the unconsolidated portion of said formation and said well-bore, at least a portion of said fracturing fluids employing propping agents for propping open the fractures formed, the amount of said consolidating material pumped into the formation being sufficient to form a longitudinally extending plastic sheath in said formation of sufficient thickness to support the particles of said formation and the fractures in said sheath resulting from the fracturing step and to permit fractures of sufficient length to form so that the propping agents will lodge in and effectively sustain the fractures, the improvement comprising the addition of a "tackifying" agent selected from the group consisting of thermosetting resins, thermoplastic polymers, rubbers, gums, natural resins, waxes, greases, heavy oils and syrup wherein said "tackifying" agent is insoluble in said fracturing fluid and has an affinity for said propping agents.

2. The improvement of claim 1 wherein said fluid carrier is water and said tackifier is insoluble in water.

3. The improvement of claim 1 wherein said fluid carrier is a hydrocarbon liquid and said tackifier is insoluble in said hydrocarbon liquid.

4. The improvement of claim 1 wherein said tackifier is a thermosetting resin.

5. The improvement of claim 1 wherein said tackifier is a thermoplastic polymer.

6. The improvement of claim 1 wherein said tackifier is rubber.

7. The improvement of claim 1 wherein said tackifier is wax.

8. The improvement of claim 1 wherein said tackifier is simple syrup.

9. The improvement of claim 1 wherein said tackifier is selected from the group consisting of phenol formaldehyde resin, furane resin, cellulose resin, styrene-butadiene rubber, reclaimed rubber, modified resins, residual hydrocarbon oils and heavy hydrocarbon oils.

10. The improvement of claim 1 wherein said propping agent is gravel of a size such that the formation sand cannot penetrate into a pack of the gravel more than three grain diameter.

* * * * *